(No Model.)
H. A. FONTEINE.
VEHICLE TIRE.
No. 605,414. Patented June 7, 1898.
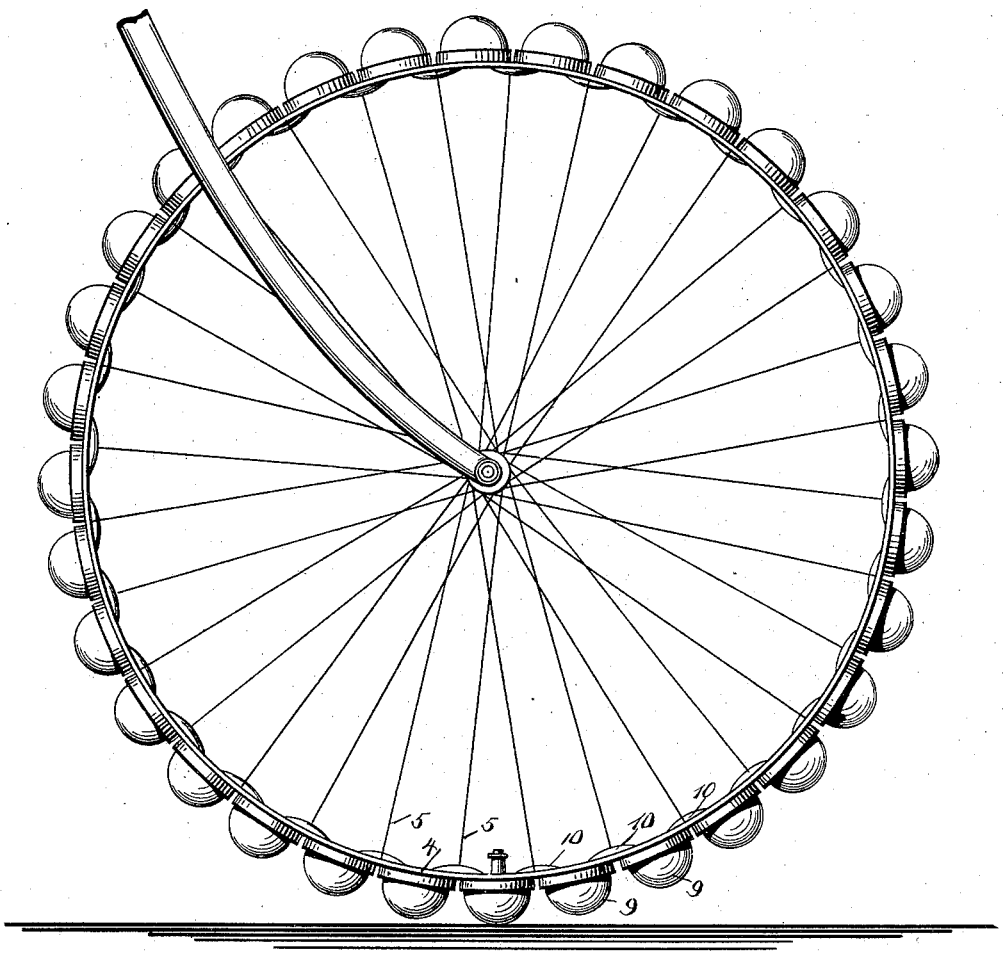
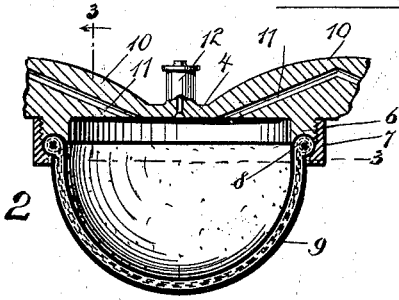
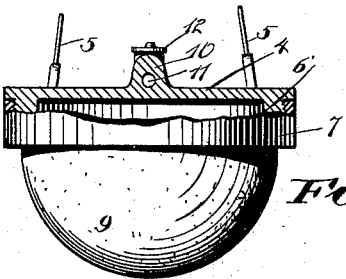
WITNESSES:
INVENTOR
BY
ATTORNEYS.

UNITED STATES PATENT OFFICE.

HERMAN A. FONTEINE, OF AUBURN, NEW YORK.

VEHICLE-TIRE.

SPECIFICATION forming part of Letters Patent No. 605,414, dated June 7, 1898.

Application filed December 21, 1897. Serial No. 662,854. (No model.)

*To all whom it may concern:*

Be it known that I, HERMAN A. FONTEINE, of Auburn, in the county of Cayuga and State of New York, have invented a new and Improved Vehicle-Tire, of which the following is a full, clear, and exact description.

This invention is a tire adapted particularly to bicycle-wheels and characterized by a rim having a number of pneumatic bulbs projecting outward therefrom and serving as the tread of the tire, the bulbs being in communication with each other, so that they may be inflated and deflated simultaneously.

This specification is the disclosure of one form of my invention, while the claims define the actual scope of the invention.

Reference is to be had to the accompanying drawings, forming a part of this specification, in which similar characters of reference indicate corresponding parts in all the views.

Figure 1 is a side elevation of the invention. Fig. 2 is a fragmentary longitudinal section of the tire, and Fig. 3 is an irregular section on the line 3 3 of Fig. 2.

The tire consists in a metallic rim 4, to which the spokes 5 of the wheel are attached. The rim 4 is provided at its outer surface with a series of annular ribs 6, exteriorly threaded and respectively receiving the clamping-rings 7, which have inwardly projected or contracted portions at their outer edges serving to hold the beads 8, that are formed at the base edges of the approximately semispherical bulbs 9. By these means the bulbs 9 are respectively hermetically connected with the ribs 6. The bulbs 9 are constructed in any desired manner of flexible material. The rim 4 is provided with a series of equidistant arc-shaped enlargements 10, leading between the contiguous bulbs 9 and provided with passages 11, which establish communication between the interiors of the bulbs. By these means the bulbs are all placed in communication with each other. A nipple 12 is in direct communication with one of the bulbs 9, and consequently with the other bulbs, through the medium of the passages 11. By means of this nipple the tire may be inflated and deflated.

It will be seen that a continuous air-passage is provided throughout the tire, thereby allowing the air to pass out gradually in case of the bursting of one of the bulbs 9, enabling the rider to dismount before any accident resulting from the bursting of the bulb could occur. It will also be seen that the bulbs 9 are independently removable, so that if one of them should be punctured it can be removed and fitted with an interior skin or film of fabric, after which it can be replaced and the series of bulbs be again inflated. The internal pressure of compressed air will force the skin or film against the inner walls of the punctured bulb and close the puncture.

Having thus described my invention, I claim as new and desire to secure by Letters Patent—

1. A vehicle-tire having a rim, a series of expansible bulbs, means for independently securing the bulbs to the rim, and a series of passages formed in the rim and connecting the bulbs with each other, one of said bulbs being in communication with a nipple, whereby all the bulbs may be inflated, substantially as described.

2. A vehicle-tire having a rim provided with a series of ridges or enlargements each having a passage extending through it, and a series of inflatable bulbs independently secured to the said rim, the passages in the said ridges or enlargements respectively connecting with adjacent bulbs, whereby the bulbs are all placed in communication with each other, substantially as set forth.

3. A vehicle-tire having a rim provided on its outer face with a series of annular ribs, a clamping-band screwing over each annular rib, and a series of inflatable bulbs provided at their base edges with beads arranged to be held between the respective ribs and clamping-bands, substantially as specified.

4. A vehicle-tire having a rim provided on its outer face with a series of annular ribs exteriorly threaded, expansible bulbs provided at their base edges with beads, clamping-rings adapted to screw on the said annular ribs and having inwardly projected or contracted portions at their outer edges serving to hold the beads against the said annular ribs, the said bulbs being in communication with each other, substantially as set forth.

5. A vehicle-tire provided with a rim, a series of expansible bulbs, means for securing said bulbs on the outer surface of the rim, the said rim being provided on its inner face with a series of equidistant arc-shaped enlargements leading between the contiguous bulbs, and each having a passage forming a communication between the interior of contiguous bulbs, respectively, substantially as described.

HERMAN A. FONTEINE.

Witnesses:
J. LEE BUNDY,
PETER HOLZHAUER, Jr.